Feb. 6, 1923.
J. N. COLLINS.
AUTOMOBILE TOP CONSTRUCTION.
FILED FEB. 21, 1917.
1,444,413.
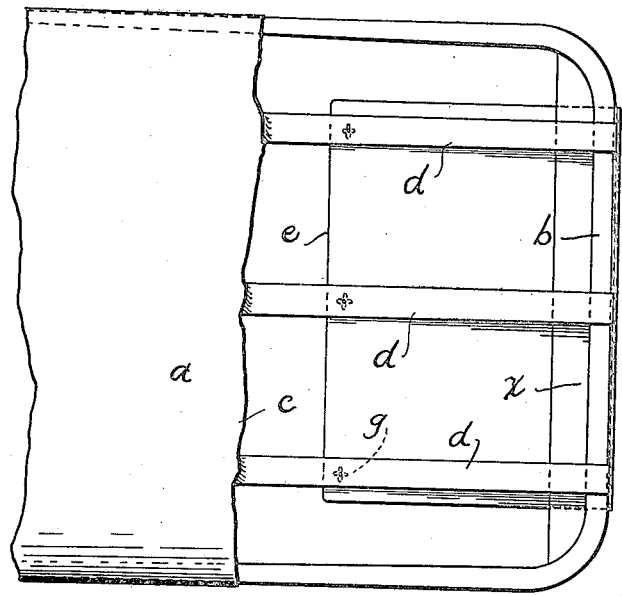
Fig. 1
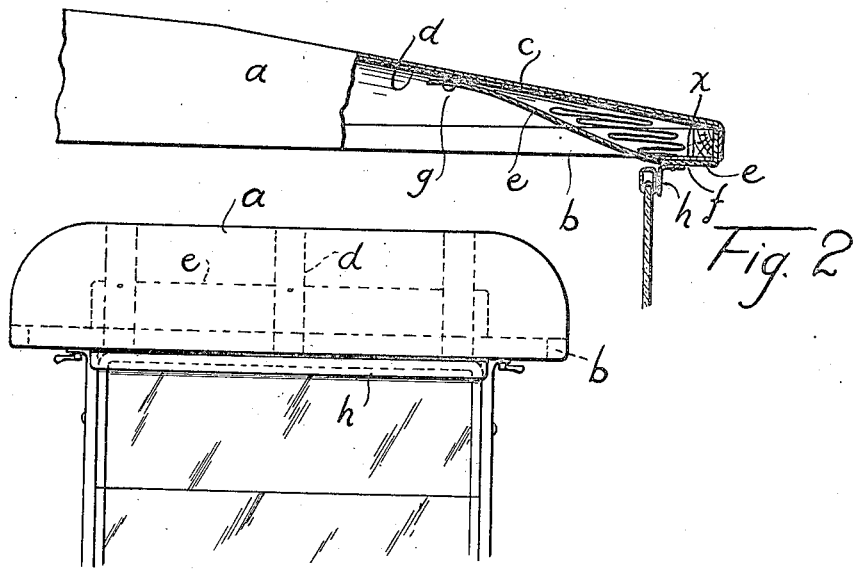
Fig. 2
Fig. 3
INVENTOR
Jeffrey N. Collins
By Raymond A. Parker
ATTORNEY Patented Feb. 6, 1923.

1,444,413

UNITED STATES PATENT OFFICE.

JEFFREY N. COLLINS, OF JACKSON, MICHIGAN.

AUTOMOBILE TOP CONSTRUCTION.

Application filed February 21, 1917. Serial No. 150,042.

*To all whom it may concern:*

Be it known that I, JEFFREY N. COLLINS, a citizen of the United States, residing at Jackson, county of Jackson, State of Michigan, have invented a certain new and useful Improvement in Automobile Top Constructions, and declare the following to be a full, clear, and exact description of the same, such as will enable others skilled in the art to which it pertains to make and use the same, reference being had to the accompanying drawings, which form a part of this specification.

This invention relates to automobile top construction. It comprises a combined vizor and curtain pocket provided with a flap which is automatically operated by the wind to seal the opening between the vizor and the windshield top.

In the drawings,—

Fig. 1 is a view of the top when the fabric is broken away, showing the stringers supporting the envelope which carries some of the curtains.

Fig. 2 is a fragmentary longitudinal section of the top.

Fig. 3 is a front elevation.

$a$ designates the deck; $b$ the forward bow; $c$ the weather-excluding fabric; $d$ the stringers; $e$ a web forming with the stiffener strip $x$ a vizor $f$ and continuing rearward to form the curtain containing envelope that is buttoned at its free end to the stringers by the turn-buttons $g$. Depending from the vizor $f$ is a sealing flap $h$ for sealing the opening between the vizor and the top of the windshield. This flap is usually constructed of fairly stiff material so that it will always depend downward and it is firmly held against the windshield by the air pressure when the vehicle is in motion. No other means is necessary.

The envelope $e$ may be utilized to store side curtains either permanently attached to the vehicle top or those that are free from the vehicle top. The substance out of which the vizor and the web are constructed, together with the web of the curtains, gives the sealing flap $h$ a support which is always maintained in the same relation that it is found in when built so as to firmly hold the flap $h$ always in a given relative position with respect to the top of the windshield.

The web $e$ which continues back to the buttons on the stringers also serves the useful function of suspending the flap $h$ so that the web itself does not get down in front of the windshield as is the case with narrow webs when the panel of the shield is tilted back and forth.

From the above description it will be seen that not only is a very convenient pocket for the storage of the curtains provided at a place where the driver of the car can very easily and comfortably reach them, but this curtain-carrying pocket acts as a good strong support for a very simple sealing flap which requires no fastening means to the windshield to be unfastened and again fastened when relative positions of the windshield panels have changed.

What I claim is:

1. In a top, the combination of a deck, and a web at the front thereof forming a vizor having a portion adapted to engage with the top of the windshield to exclude air and continuing to the rear where it forms with the vizor a curtain-retaining pocket.

2. In a vehicle top, the combination of a deck, a web secured to the front and under side of the deck forming a vizor and continuing to the rear where it forms with the vizor a curtain-retaining pocket, and a flap depending from said web and adapted to rest in front of and at the top of the windshield.

3. In a vehicle top, the combination of a deck, a web secured to the front and under side of the deck and extending to the rear, forming a curtain-containing pocket, and a flap depending from said web and adapted to rest in front of and at the top of the windshield.

4. In a vehicle top, the combination of a deck, a web secured to the under side of the deck at the front and containing at its free end parts of fastening devices, parts of fastening devices secured to the under side of the deck at somewhat spaced points from the front thereof and arranged to detachably engage with the parts of fastening devices on the web, and a flap depending from said web and adapted to rest in front of and at the top of the windshield.

In testimony whereof, I sign this specification.

JEFFREY N. COLLINS.